United States Patent
Watt et al.

(10) Patent No.: US 10,514,084 B2
(45) Date of Patent: Dec. 24, 2019

(54) INFINITELY VARIABLE POWER TRANSMISSION SYSTEM

(71) Applicant: Deere & Company, Moline, IL (US)

(72) Inventors: Dwayne B. Watt, Bartlesville, OK (US); G. William Detrick, Coffeyville, KS (US); Randall L. Long, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 27 days.

(21) Appl. No.: 15/787,218

(22) Filed: Oct. 18, 2017

(65) Prior Publication Data

US 2019/0113110 A1    Apr. 18, 2019

(51) Int. Cl.
| | | |
|---|---|---|
| *F16H 3/72* | (2006.01) | |
| *A01D 46/08* | (2006.01) | |
| *B60K 6/08* | (2006.01) | |
| *A01D 69/06* | (2006.01) | |

(52) U.S. Cl.
CPC .............. *F16H 3/72* (2013.01); *A01D 46/08* (2013.01); *A01D 69/06* (2013.01); *B60K 6/08* (2013.01)

(58) Field of Classification Search
USPC .............................................. 475/72; 74/720
See application file for complete search history.

(56) References Cited

U.S. PATENT DOCUMENTS

| 2,825,235 | A | * | 3/1958 | Hindmarch | F16H 3/10 475/52 |
|---|---|---|---|---|---|
| 4,019,404 | A | * | 4/1977 | Schauer | F16H 47/04 475/82 |
| 4,138,907 | A | * | 2/1979 | Melles | B60K 17/04 475/72 |
| 4,587,866 | A | | 5/1986 | Kraus | |
| 5,667,452 | A | * | 9/1997 | Coutant | F16H 47/04 475/72 |
| 5,785,623 | A | * | 7/1998 | Iino | F16H 47/04 475/72 |
| 5,803,856 | A | * | 9/1998 | Iino | F16H 47/04 475/72 |
| 5,820,505 | A | * | 10/1998 | Parker | F16H 47/04 475/72 |
| 6,039,666 | A | * | 3/2000 | Okuda | F16H 47/04 475/72 |
| 6,247,295 | B1 | * | 6/2001 | Hansen | F16H 47/04 475/72 |
| 6,616,559 | B1 | * | 9/2003 | Hori | B62D 11/18 475/218 |
| 6,726,560 | B2 | * | 4/2004 | Ho | A01D 41/1274 460/59 |

(Continued)

*Primary Examiner* — Dirk Wright
(74) *Attorney, Agent, or Firm* — Klintworth & Rozenblat Ip LLP (57) ABSTRACT

A power transmission system is disclosed for infinitely variable speed capability. The power transmission system includes a pair of power units, each configured to deliver a rotational torque to drive an output element. A transmission arrangement receives the rotational torques from the power units and delivers a resulting torque to the output element. The transmission arrangement includes a gear set coupling the one power unit to the output element to deliver torque through a mechanical meshing engagement that is continuously effected between the first power unit and the output element.

16 Claims, 4 Drawing Sheets

(56) References Cited

U.S. PATENT DOCUMENTS

| | | | | |
|---|---|---|---|---|
| 6,984,171 B2* | 1/2006 | Brome | ............... | A01D 41/1274 460/59 |
| 7,186,201 B2* | 3/2007 | Brome | ............... | A01D 41/1274 475/254 |
| 7,354,369 B2* | 4/2008 | Hasegawa | ................ | B60K 5/00 475/72 |
| 7,416,502 B2* | 8/2008 | Ulbrich | .................. | F16H 47/04 475/72 |
| 8,414,439 B2* | 4/2013 | Bailly | .................... | F16H 47/04 475/72 |
| 8,517,133 B2* | 8/2013 | Carl | ....................... | B60K 17/08 180/165 |
| 9,504,203 B2 | 11/2016 | Goering et al. | | |
| 9,676,266 B2* | 6/2017 | Tseng | .................... | B60K 6/365 |
| 9,765,502 B2* | 9/2017 | Heybroek | ............... | F16H 47/04 |
| 2006/0145482 A1* | 7/2006 | Roethler | ................ | F02D 29/02 290/40 C |
| 2015/0045167 A1* | 2/2015 | Lee | ........................ | F16H 47/04 475/72 |
| 2016/0290459 A1 | 10/2016 | Warth et al. | | |

\* cited by examiner

FIG. 4 ns to related applications -->

INFINITELY VARIABLE POWER TRANSMISSION SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to power transmissions, including transmission systems for powering work vehicles and machinery with infinitely variable speed capability.

BACKGROUND OF THE DISCLOSURE

An infinitely variable transmission (IVT) is a type of automatic transmission that changes seamlessly through a continuous range of effective gear ratios. In particular, an IVT produces ratios of output shaft speed to input shaft speed through a speed range that includes a zero ratio, which provides a zero output speed. IVTs may be used in a variety of applications including for vehicle propulsion and machinery drive purposes.

Vehicles may be configured such that various components, including ground drive and harvesting components, may be driven by a power source using an IVT. For example, in a harvester, an engine may power a ground drive and various harvesting units. This may be useful, for example, to provide variable control over the operating speeds of the ground drive arid the harvesting units.

SUMMARY OF THE DISCLOSURE

According to one aspect of the disclosure, a power transmission system includes a pair of power units, each configured to deliver a rotational torque to drive an output element. A transmission arrangement receives the rotational torques from the power units and delivers a resulting torque to the output element. The transmission arrangement includes a gear set coupling one power unit to the output element to deliver torque through a mechanical meshing engagement that is continuously effected between the first power unit and the output element.

In certain embodiments, the transmission arrangement of a power transmission system includes a planetary gear arrangement that does not include a ring gear encircling the planet gears.

According to another aspect of the disclosure, a power transmission system includes a pair of power units that deliver rotational torque to drive an output element. A transmission arrangement receives the rotational torque from the power units and delivers a resulting torque to the output element. The transmission arrangement includes an input gear driven by one power unit providing a continuous mechanical meshing engagement between the input gear and the output element. Another input gear is driven by the other power unit at variable speeds. The transmission arrangement combines the torques from the input gears to drive the output element at the resulting torque.

According to still another aspect of the disclosure, a power transmission system includes a pair of power units. A transmission arrangement couples the power units with an output element. The transmission arrangement includes an input gear driven by one of the power units to provide a continuous mechanical meshing engagement between the input gear and the output element. Another input gear is driven by the other power unit at variable speeds and directions so that the transmission arrangement effects variable forward speeds of the output element, a zero output speed of the output element, and variable reverse speeds of the output element.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed power transmission system, as shown in the accompanying figures of the drawings described briefly above. Various modifications to the example embodiments may be contemplated by one of skill in the art.

As used herein, "between" may be indicate the relationship of various components along a power-transmission path, rather than necessarily the relationship of various components in physical space. In this regard, a power transmission component may be viewed as being "between" two other components if power may flow between the two other components via the power transmission component, even if it is not disposed in the physical space separating the two components. For example, if power is transmitted in one direction from a power source to a gear arrangement, and is then routed by the gear arrangement to a working unit by an output element that extends past the power source in a second direction, the gear arrangement and the output element may be viewed as being "between" the power source and the working unit even though the gear arrangement (and part of the output element) may not occupy the physical space separating the power source and the working unit.

In various examples discussed below, particular arrangements of power transmission elements, shafts, gears, clutches, and other components may be presented. It will be understood that various alternative (or additional) configurations of such power transmission elements, shafts, gears, clutches, or other components may be utilized without departing from the teachings of this disclosure. For example, a single shaft in various embodiments may be replaced, in other embodiments, with an arrangement of multiple shafts (e.g., multiple coaxial shafts, or multiple offset shafts connected by various gear arrangements). Likewise, a particular arrangement of multiple shafts in certain embodiments may be replaced (or supplemented), in other embodiments, with a different arrangement of multiple (or individual) shafts. For example, an arrangement of parallel shafts may be replaced (or supplemented) with an arrangement of nested, coaxial shafts (e.g., one hollow shaft surrounding another coaxial shaft). Further, a connection including a particular number or arrangement of gears in certain embodiments may be replaced with a connection including a different number or arrangement of gears in other embodiments. For example, a meshing engagement between two gears to transmit power between those gears may be replaced by a meshing between the two gears, respectively, and a number of idler gears, in order also to transmit power between the two gears. Further, in certain embodiments, various example clutches may be replaced (or supplemented) with other selective engagement mechanisms configured to provide similar power-transmission states.

It will further be understood that various changes in the direction of power transmission (or the rotational direction of transmitted power) may be accomplished using various alternative arrangements. As such, embodiments depicting transmission of power in a particular direction are not presented to the exclusion of similar (or other) embodiments transmitting power in other directions. For example, various embodiments below may present transmission of power from an engine to a working unit with generally parallel rotation of the various power-transmitting components (e.g., various shafts and gears). It will be understood, however, that components of certain working units may operate via rotation around an axis that is not parallel with an axis of rotation of output power from the engine (or another power source). As such, although parallel rotation may be depicted in various embodiments, various known arrangements (e.g., bevel gear arrangements, universal joints, constant-velocity joints, and so on) may be utilized to provide rotational power to (or within) a working unit along a different rotational axis than the power output from the engine or other power source.

In one or more example implementations of the disclosed power transmission system, infinitely variable output speeds are provided through a split power path with dual inputs. Generally, the disclosed infinitely variable power transmission system provides seamless transition through forward speed ratios, a zero speed ratio, and reverse speed ratios, with improved efficiency. In certain embodiments, one input is provided via a constant speed power source for maximum efficiency and the other input is provided by a variable speed power source to provide an infinitely variable output speed.

The following description relates to a power transmission system that may be described in the context of a work vehicle, and in particular a cotton picker application with harvesting units as working units, for purposes of demonstrating an example. During operation, it may be useful to control the operating speeds of the harvesting units of the cotton picker. For example, to effectively gather cotton from a field during harvesting, it may sometimes be useful to vary operating speeds of the harvesting units in proportion to the ground speed of the harvester. Under other conditions, the harvesting units may be operated at a speed independent of the ground speed of the harvester, such as in relation to the density of the crop.

The present disclosure is not limited to cotton picker harvester unit drive applications or to harvesters in general, but rather, also encompasses any application where infinitely variable output is desired, including those where zero speed output is required. Accordingly, the teachings of the present disclosure are applicable to power transmission systems in a variety of applications, such as work vehicle propulsion drives, machinery and equipment drives, power take-off systems, power generator drives, and others.

In an example of the present disclosure as further described below, a power transmission system includes a first power unit delivering a first rotational torque and a second power unit delivering a second rotational torque to drive an output element. A transmission arrangement receives the first and second rotational torques and delivers a resulting torque to the output element. The transmission arrangement includes a gear set coupling the first power unit to the output element and through which, the first rotational torque is routed. The combination of gears and other torque transmission elements provides a mechanical meshing engagement that is continuously effected between the first power unit and the output element.

Figure 1:
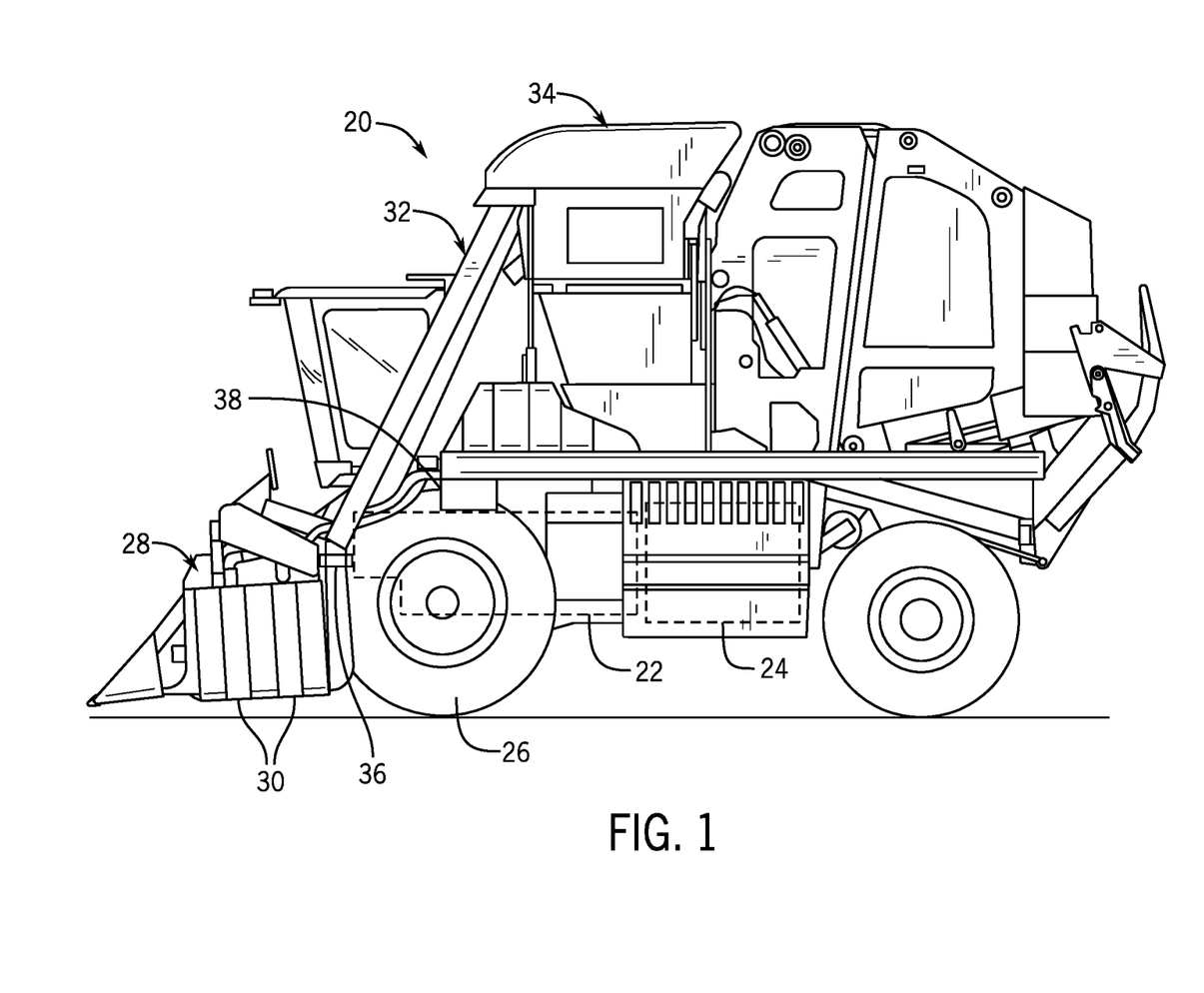
FIG. 1 is a side view of an example harvesting vehicle, configured as a cotton picker.

As noted above, the power transmission system described herein may be employed in a variety of applications. Referring to FIG. 1, one example involves a cotton picker 20, depicted with a power transmission system 22 for transmitting power from a power source in the form of an engine 24 of the cotton picker 20, to a set of forward harvesting units 28 for gathering cotton. As depicted, harvesting units 28 include various drums 30, which rotate during operation of the harvesting units 28 to pull fiber and seed from cotton plants. Cotton gathered by the harvesting units 28 is moved by air pressure through a duct arrangement 32 into the body 34 of the cotton picker 20 (e.g., for forming into bales). In the configuration depicted, and as discussed in greater detail below, the harvesting units 28 receive operating power from the engine 24 via the power transmission system 22. As depicted, for example, each individual harvesting unit 28 (or a set of multiple harvesting units 28) may be mechanically powered by a corresponding drive shaft 36 extending from the power transmission system 22 to the harvesting unit 28. In other embodiments, a different arrangement (e.g., an arrangement of various shafts, gears or other torque transmitting elements) may be utilized to communicate power from various power sources to the harvesting units 28. In the current example the engine 24 provides the power source as an internal combustion engine. In other examples, the power source may be an electric motor, a hybrid drive system, or another alternative powertrain source.

The engine 24 may also be used to power the wheels 26 to propel the cotton picker 20 through a drive system (not shown). The cotton picker 20 may include various other devices and systems. As depicted, for example, the cotton picker 20 includes a controller 38. The controller 38 may be configured in a variety of ways, including as an electronic computing device with one or more processors and memory architectures, as a programmable electronic circuit, or otherwise. In certain embodiments, the controller 38 may be disposed at other locations, including locations remotely located from the cotton picker 20. In certain embodiments, multiple controllers may be utilized. For example, the controller 38 may be configured as a transmission control unit for controlling operation of various devices of the power transmission system 22, and another controller (not shown) may be configured as an engine control unit for controlling operation of the engine 24.

Figure 2:
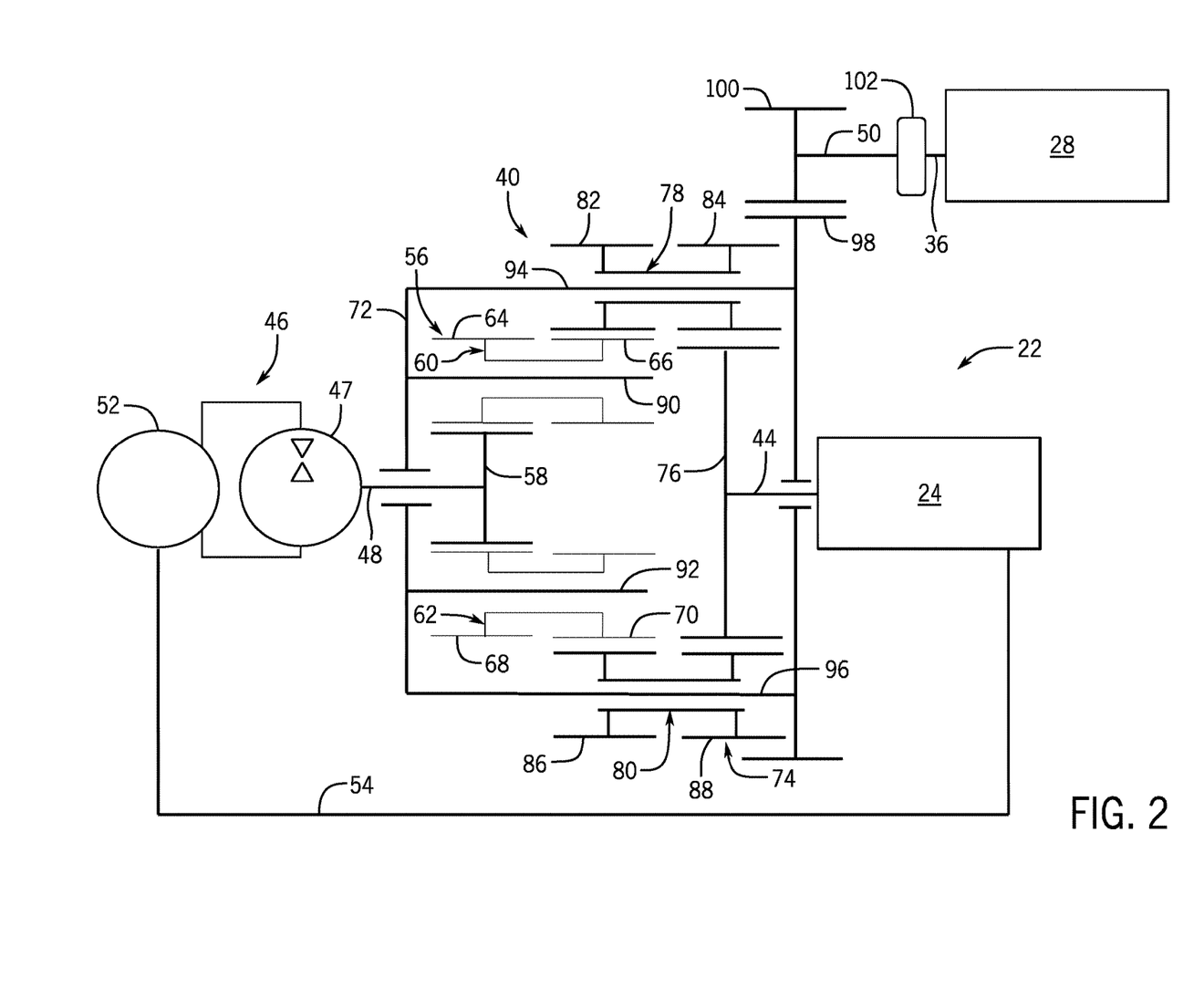
FIG. 2 is a schematic view of an example power transmission arrangement, such as for the harvesting units of the harvesting vehicle of FIG. 1.

Referring also to FIG. 2, the power transmission system 22 includes an example embodiment of a transmission arrangement 40 for use with the cotton picker 20 (or other work vehicles). In the embodiment depicted, power from the power source in the form of the engine 24 is delivered to the power transmission system 22 by an input shaft 44, which is continuously driven to rotate when the engine 24 is operating. In this example, the engine 24 is an internal combustion engine and is operated at a constant speed selected to maximize efficiency. For example, the engine 24 is operated at the speed of highest brake specific fuel consumption efficiency for the application's load. Accordingly, the input shaft 44 may rotate at a constant speed appropriate for the load during a given operating mode of the transmission arrangement 40. In some examples the engine 24 operates at a constant speed across multiple or all operating modes. In general, the engine 24 as the power source delivers a rotational torque to the transmission arrangement 40 through the input shaft 44. In this example, the rotational torque is delivered through the transmission arrangement 40 to an output element 50, and is used to drive the harvesting units 28 using mechanical energy delivered by the engine 24 in an efficient manner.

Another power source 46 provides power to the transmission arrangement 40 through another input shaft 48. In general, the second power source 46 provides another rotational torque input to the transmission arrangement 40. When the input provided by the power source 46 is summed with the input delivered from the engine 24, infinitely variable speeds of an output element 50 are effected, as further detailed below. In addition, the transmission arrangement 40 may be configured to provide for reverse-direction operation of the harvesting units 28 as further detailed below. This may be useful, for example, in order to clear material that has accumulated in the harvesting units 28, or for other reasons.

In the current example, the power source 46 includes a hydraulic motor 47 that converts hydraulic pressure arid flow into torque arid rotation. For example, the hydraulic motor 47 may be a gear and vane, gerotor, axial plunger or radial piston type of hydraulic motor. In the current example the hydraulic motor 47 is reversible. The hydraulic motor 47 receives hydraulic pressure and flow through various conduits from a variable displacement hydraulic pump 52, such as an axial piston pump or a variable vane pump. Accordingly, the torque and rotation supplied to the input shaft 48 is varied by varying the displacement of the hydraulic pump 52 to change the output from the hydraulic motor 47. The hydraulic pump 52 is provided with power from the engine 24 such as through a shaft 54. In other examples, the power source 46 may be any variable drive mechanism such as an electric motor or mechanically driven device. It will be understood that the power source 46 may include various additional hydraulic devices such as valves, regulators, a reservoir, or others, which are omitted form the illustration for simplicity.

The input shaft 48 is coupled with a gear set 56 forming a planetary gear arrangement, which in this example is connected in a compound planetary configuration. The input shaft 48 is connected with a sun gear 58 of the gear set 56. A number of planet gears 60, 62 are disposed around the sun gear 58 and are in meshed engagement therewith. In FIG. 2 two planet gears 60, 62 are shown but another number of individual planet gears may be included and all may be equally spaced around the sun gear 58. The planet gears 60, 62 are constructed in the form of composite planet gears, each with a pair of pinions 64, 66 and 68, 70, respectively. The pinions 64, 66 are paired together as rigidly connected gears that are longitudinally arranged to rotate together about a common axis, and may have different radii and/or different numbers of teeth. Similarly, the pinions 68, 70 are paired together as rigidly connected gears that are longitudinally arranged to rotate together about a common axis, and may have different radii and/or different numbers of teeth.

Accordingly, the element that meshes with the pinion 64 or 68 may rotate at a different speed as compared to the element that meshes with the pinion 66 or 70, respectively. In this example, one of each pair of pinions engages the sun gear 58 and is driven thereby. Specifically, pinions 64 and 68 mesh with, and are driven by, the sun gear 58. The planet gears 60, 62 are rotationally arranged on a carrier 72, which is disposed in the transmission arrangement 40 to rotate.

Returning to the power source provided by the engine 24, the input shaft 44 is coupled with a gear set 74, which forms a planetary gear arrangement. In this example the input shaft 44 is connected with a sun gear 76 of the gear set 74. A number of planet gears 78, 80 are disposed around the sun gear 76 and are in meshed engagement therewith. In FIG. 2 two planet gears 78, 80 are shown but another number of individual gears may be included and all may be equally spaced around the sun gear 76. The planet gears 78, 80 are in the form of composite planet gears, each with pair of pinions 82, 84 and 86, 88, respectively. The pinions 82, 84 are paired together as rigidly connected gears that are longitudinally arranged to rotate together about a common axis, and may have different radii and/or different numbers of teeth. Similarly, the pinions 86, 88 are paired together as rigidly connected gears that are longitudinally arranged to rotate together about a common axis, and may have different radii and/or different numbers of teeth. Accordingly, the element that meshes with the pinion 82 or 86 may rotate at a different speed as compared to the element that meshes with the pinion 84 or 88, respectively. One of each pair of pinions engages the sun gear 76 arid is driven thereby. In this example, pinions 84 and 88 mesh with the sun gear 76 and are driven thereby. The planet gears 78, 80 are rotationally arranged on the carrier 72, along with the planet gears 60, 62. One of each pair of pinions of the planet gears 78, 80 engages a respective one of the pinions of the planet gears 60, 62. In this example, pinions 82, 86 mesh with pinions 66, 70 respectively, providing the compound planetary configuration in the transmission arrangement 40. Meshing engagement between the planet gears 60, 62 and the planet gears 78, 80 respectively, provides a coupling between the two power sources, namely, the engine 24 and the hydraulic motor 47/hydraulic pump 52, so that their inputs are combined in driving the carrier 72 to rotate. In this example, the gear sets 56, 74 do not include ring gears that would otherwise encircle and mesh with the planet gears, saving in cost and weight of the transmission arrangement 40. To effectively and efficiently transfer torque to the output element 50, a reaction force is established for the input provided by the hydraulic motor 47 against the torque supplied by the engine 24 via the meshed engagement of the planet gears 60, 62 and 78, 80 respectively, which enables achieving very slow to no speed output at the output element 50, without the use of clutches or brakes in the transmission arrangement 40. Specifically, no clutch or brake is required in the power paths between the input shafts 44, 48 and the output element 50.

Returning to the carrier 72, in this example it includes pins 90, 92, which are a fixed part of the carrier 72 on which the planet gears 60, 62 respectively, are rotationally mounted. The carrier 72 also includes pins 94, 96, which are a fixed part of the carrier 72 on which the planet gears 78, 80 are rotationally mounted. The carrier 72 includes a gear 98 which is configured to rotate with the carrier 72 and may be an integral part thereof, or a separate connected piece. The gear 98 meshes with a gear 100, which is configured to rotate with the output element 50 and may be an integral part thereof, or a separate connected piece. As such, rotation of the carrier 72 drives the output element 50 through the gears 98, 100. A clutch 102, or another selective engagement mechanism may be disposed between the gear 100 and the harvesting units 28 for selectively connecting or disconnecting the harvesting units 28 from the transmission arrangement 40, when desired. The clutch 102 may include various other devices and components (not shown), including control electronics, hydraulic lines and control systems, various shafts or gears, and others. In other examples where disconnecting the working units is not needed, the clutch 102 may be omitted.

To operate the harvesting units 28, the clutch 102 is engaged with the engine 24 operating. It will be understood that the power source 46 is also operated, as further described below. The engine 24 drives the input shaft 44, rotating the sun gear 76. The sun gear 76 drives the relatively smaller planet gears 78, 80 to rotate, applying a force to the pins 94, 96 causing the carrier 72 to rotate. The gear 98 is driven to rotate with the carrier 72 causing the gear 100 and output element 50 to rotate, driving the harvesting units 28 through the clutch 102. As noted above, the engine 24 may be operated at a constant speed for efficiency purposes. The constant speed may be the same for all operating modes of the power transmission system 22, or may be selected to provide different constant speeds for different operating modes of the power transmission system 22. For example, if different modes exist with significantly different torque requirements, different constant speeds of the engine 24 may be used for each of those different torque requirements to maximize efficiency. This enables maintaining efficient operation of the engine 24 in applications including those with constant torque requirements and also in applications with changing torque requirements. In either case, the majority of the torque required may be supplied by the engine 24 as the primary power source. The power source 46 may then provide input to vary the speed of the output element 50 through its power path, which includes the gear set 74. The hydraulic motor 47 of the power source 46 may be operated to increase or decrease the rotational speed of the carrier 72, and therefore that of the output element 50, and to reverse directions. For example, when the hydraulic motor 47 is operated, the input shaft 48 and the sun gear 58 rotate. The sun gear 58 drives the relatively smaller planet gears 60, 62 to rotate, applying a force to the pins 90, 92 causing the carrier 72 to rotate. With the effect on the carrier 72 from the planet gears 60, 62 added to the effect on the carrier 72 from the planet gears 78, 80, the gear 98 is driven to rotate with the carrier 72 causing the gear 100 and output element 50 to rotate, driving the harvesting units 28 through the clutch 102. The hydraulic motor 47 may be operated to increase the speed of the carrier 72 as compared to the speed achieved from the engine 24 alone, or to decrease the speed of the carrier 72, including to achieve very low speeds or zero speed. The speed varying relationship of the transmission arrangement 40 is represented by the equation:

$$n_{72} = \frac{n_{44} + n_{48}\left(\frac{N_{58} * N_{66} * N_{84}}{N_{64} * N_{82} * N_{76}}\right)}{1 + \left(\frac{N_{58} * N_{66} * N_{84}}{N_{64} * N_{82} * N_{76}}\right)}$$

where:
$n_{72}$ is the speed of the carrier 72, in rpm;
$n_{44}$ is the speed of the input shaft 44, in rpm;
$n_{48}$ is the speed of the input shaft 48, in rpm;

$N_{58}$ is the gear tooth count of the sun gear 58;
$N_{64}$ is the gear tooth count of the pinion 64;
$N_{66}$ is the gear tooth count of the pinion 66;
$N_{78}$ is the gear tooth count of the sun gear 76;
$N_{82}$ is the gear tooth count of the pinion 82; and
$N_{84}$ is the gear tooth count of the pinion 84.

Through the example of the transmission arrangement 40, the output element 50 is driven in an infinitely variable manner with input from dual power sources and a split power path that is joined through the carrier 72. One of the power sources is an engine 24 in the example, which provides a mechanical drive power path that may deliver a majority of the torque for the output element 50. This enables providing more torque at the output element 50 as compared to hydraulic drive alone, which translates to advantages such as greater bale density in the example of the cotton picker 20. The mechanical drive power path provides efficiency gains over hydraulic drive by allowing the engine to operate at its peak efficiency, and by avoiding hydraulic losses such as those encountered in transitions between hydraulic and mechanical components, fluid transmission losses, and pumping losses. As a result, more power of the engine may be available for other uses in the work vehicle or other application. High overall system efficiency is achieved by minimizing the power flow through the variable speed sun gear 58. Efficient operation is optimized in the normal operating range of the harvester units 28 by the prudent selection of gear ratios and other input drive components. The speed of the output element 50 is a sum of the speeds of the input shafts 44, 48 and is a function of the sun gears 58, 76, and of the pinions 64, 66, 82 and 84. It will be appreciated that the pinions 68, 70, 86 and 88 (and those of any additional planet gears), do not change the speed contribution of the pinions identified in the above equation, but act to distribute the loads around the gear sets 56, 74.

Figure 3:
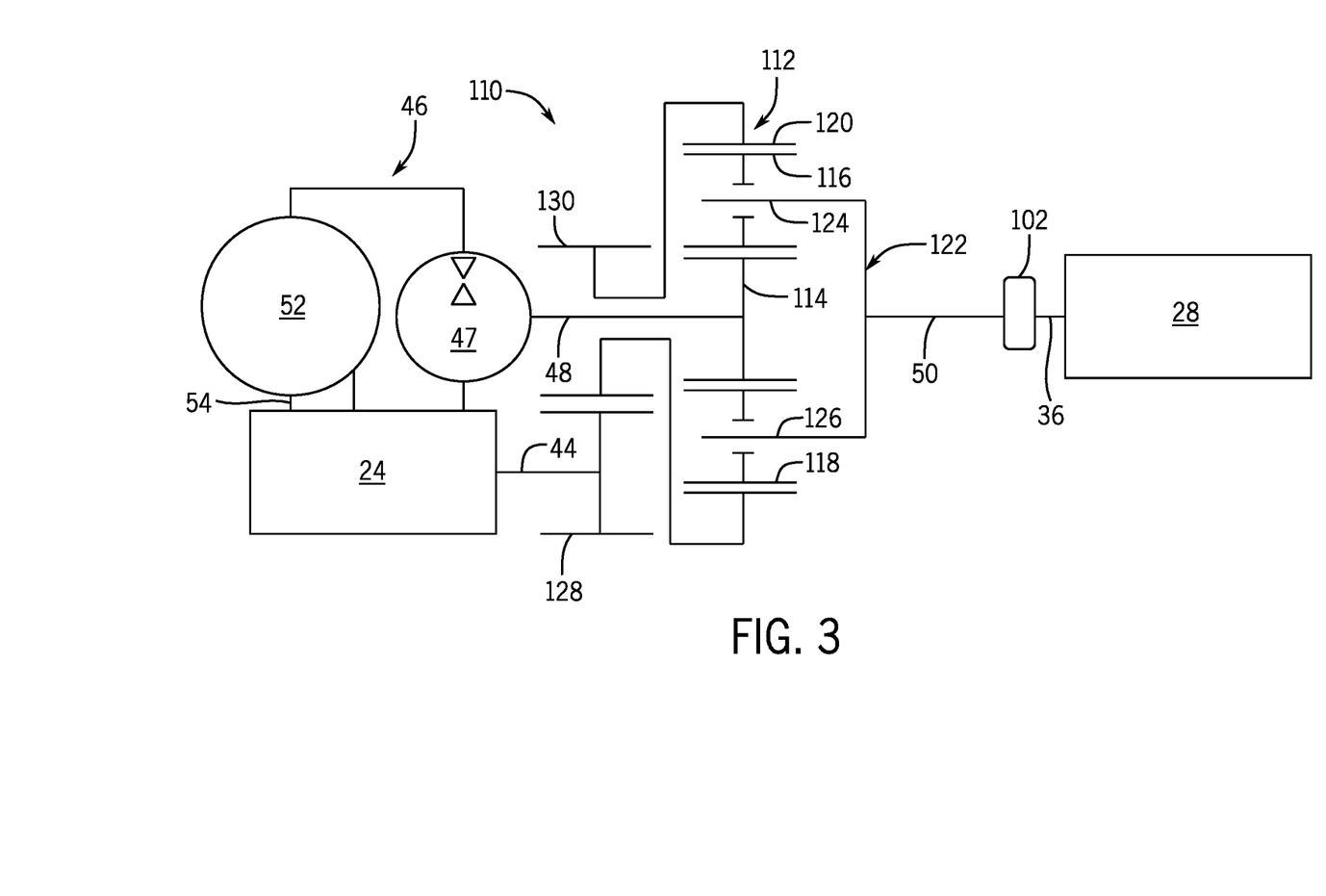
FIG. 3 is a schematic view of another example power transmission arrangement, such as for the harvesting units of the harvesting vehicle of FIG. 1.

Referring to FIG. 3, the power transmission system 22 is constructed in an example with a transmission arrangement 110 having a simplified planetary configuration. The input shaft 44 is again driven by a power source in the form of the engine 24 and the input shaft 48 is driven by the power source 46 with the hydraulic motor 47 and the hydraulic pump 52. The hydraulic pump 52 is again driven by the engine 24 through the shaft 54. The transmission arrangement 110 drives the harvesting units 28 through the output element 50, the clutch 102 and the drive shaft 36. In this example, the input shaft 48 is coupled with a gear set 112, which forms a planetary gear arrangement. The input shaft 48 is connected with a sun gear 114 of the gear set 112. A number of planet gears 116, 118 are disposed around the sun gear 114 and are in meshed engagement therewith. In FIG. 3 two planet gears 116, 118 are shown but another number of individual gears may be included and all may be equally spaced around the sun gear 114. In this example, the planet gears 116, 118 are encircled by a ring gear 120 and are in meshed engagement therewith. The planet gears are mounted on a carrier 122 and are rotationally disposed on pins 124, 126, respectively. The carrier 122 is configured to rotate with the output element 50 and the two may be formed as one piece or as separate connected parts.

In this example, the input shaft 44 is connected with a gear 128 which meshes with another gear 130. The gear 130 is connected with the ring gear 120 and the two may be formed as one piece or as separate connected parts. The input shaft 48 passes through the center of the gear 130 and the two rotate about a common axis. The engine 24 mechanically drives the carrier 122 and the output element 50 through the input shaft 44, the gears 128, 130, the ring gear 120 and the planet gears 116, 118. The engine 24 may be operated at a constant speed at its peak efficiency and the rotational speed of the output element 50 may be infinitely varied through additional operation of the power source 46. The hydraulic motor 47 may be operated to reversibly drive the input shaft 48 through the power path of the sun gear 114, the planet gears 116, 118, and the carrier 122. The transmission arrangement 110 sums the inputs of input shafts 44, 48 and provides the resulting output through the carrier 122 to the output element 50.

Figure 4:
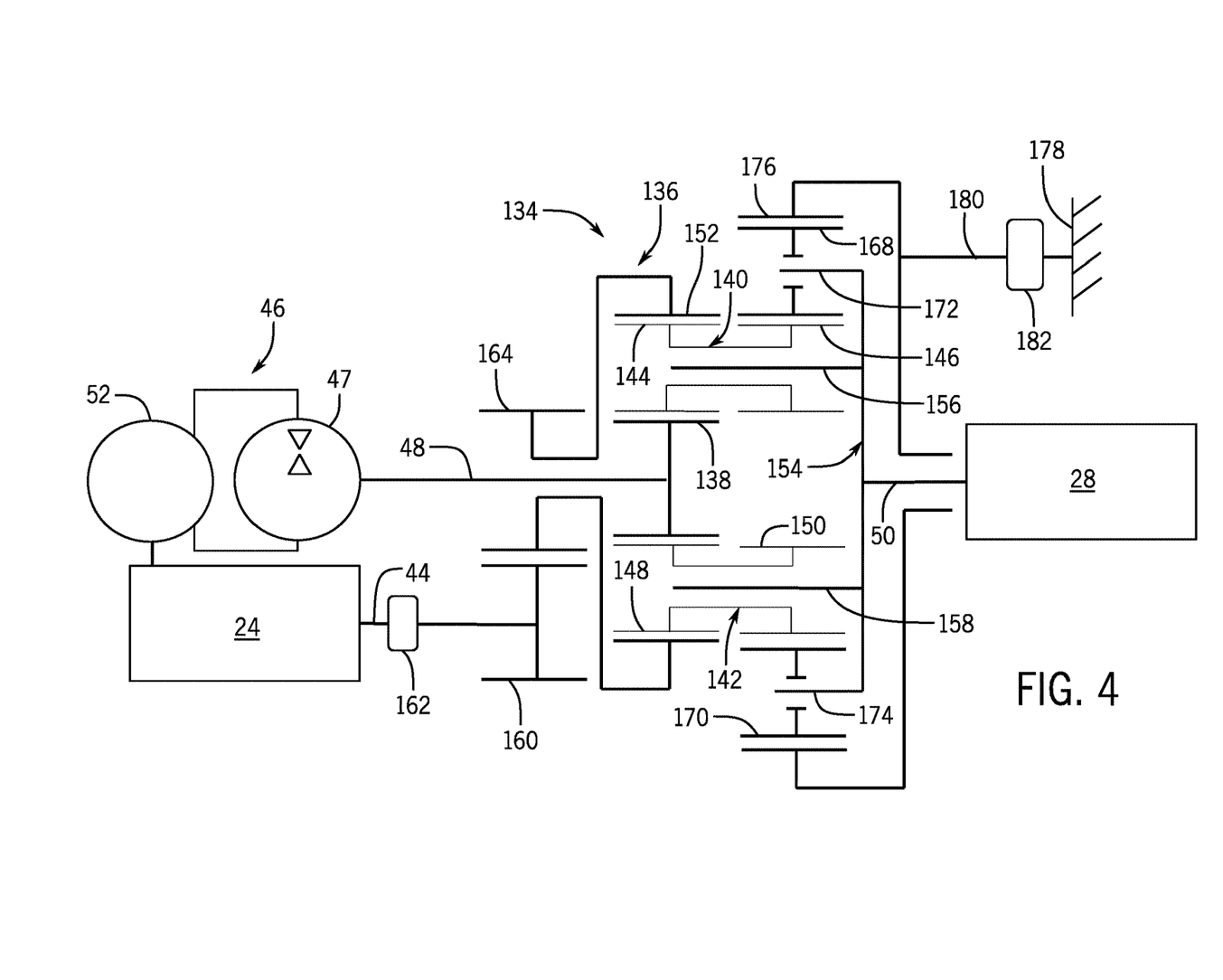
FIG. 4 is a schematic view of another example power transmission arrangement, such as for the harvesting units of the harvesting vehicle of FIG. 1

Referring to FIG. 4, the power transmission system 22 is constructed with a transmission arrangement 134 having a compound planetary configuration. The input shaft 44 is again driven by a power source in the form of the engine 24 and the input shaft 48 is driven by the power source 46 with the hydraulic motor 47 and the variable displacement hydraulic pump 52. The hydraulic pump 52 is again driven by the engine 24 through the shaft 54. The transmission arrangement 134 drives the harvesting units 28 through the output element 50 and the clutch 102. In this example, the input shaft 48 is coupled with a gear set 136, which forms a planetary gear arrangement. The input shaft 48 is connected with a sun gear 138 of the gear set 136. A number of planet gears 140, 142 are disposed around the sun gear 138 and are in meshed engagement therewith. In FIG. 4, two planet gears 140, 142 are shown but another number of individual gears may be included and all may be equally spaced around the sun gear 138. The planet gears 140, 142 are in the form of composite planet gears, each with pair of pinions 144, 146 and 148, 150, respectively. The pinions 144, 146 are paired together as rigidly connected gears that are longitudinally arranged to rotate together about a common axis, and may have different radii and/or different numbers of teeth. Similarly, the pinions 148, 150 are paired together as rigidly connected gears that are longitudinally arranged to rotate together about a common axis, and may have different radii and/or different numbers of teeth. One of each pair of pinions meshes with the sun gear 138 and is driven thereby. In this example, pinions 144, 148 mesh with the sun gear 138 and are driven thereby. The planet gears 140, 142 are rotationally arranged on a carrier 154, which is rotationally disposed in the transmission arrangement 134.

In the example of FIG. 4, the planet gears 140, 142 are encircled by a ring gear 152 and are in meshed engagement therewith through the pinions 144, 148. The planet gears 140, 142 are mounted on a carrier 154 and are rotationally disposed on pins 156, 158, respectively. The carrier 154 is configured to rotate with the output element 50 and the two may be formed as one piece or as separate connected parts.

In this example, the input shaft 44 is connected with a gear 160 through a clutch 162. The clutch 162 provides an engagement mechanism for selectively connecting or disconnecting the engine 24 from the transmission arrangement 134. The gear 160 meshes with another gear 164. The gear 164 is connected with the ring gear 152 and the two may be formed as one piece or as separate connected parts. The input shaft 48 passes through the center of the gear 164 and the two rotate about a common axis. The engine 24 mechanically drives the carrier 154 and the output element 50 through the input shaft 44, the clutch 162, the gears 160, 164, the ring gear 152 and the planet gears 140, 142. The engine 24 may be operated at a constant speed at its peak efficiency and the rotational speed of the output element 50 may be infinitely varied through operation of the power source 46. The hydraulic motor 47 may be operated to reversibly drive the input shaft 48 through a power path that includes the sun gear 138, the planet gears 140, 142, and the carrier 154. The transmission arrangement 134 sums the input at the input shaft 44 and the input shaft 48, and provides the resulting output through the carrier 154 to the output element 50.

The transmission arrangement 134 includes a compound planetary configuration with another set of planet gears, including planet gears 168, 170 in meshing engagement with the pinions 146, 150 respectively. The planet gears 168, 170 are mounted on the carrier 154 and are rotationally disposed on pins 172, 174 respectively. A ring gear 176 encircles the planet gears 168, 170 and is in meshing engagement therewith. The ring gear 176 is selectively coupled with a case 178 (which does not rotate), through a torque transfer element 180 and a brake 182. In this example, the torque transfer element 180 is in the form of an annular rotor and may be formed together with the ring gear 176 as one piece, or the two may be separate connected parts. To provide very low to zero speeds of the output element 50, the engine 24 is disconnected from the transmission arrangement 134 by disengagement of the clutch 162, and the ring gear 176 is connected with the case 178 by engagement of the brake 182. This provides a second reaction for the transmission arrangement 134 along with the input of the power source 46 through the input shaft 48, when the engine is disconnected.

Through the examples described above, a power transmission system delivers infinitely variable output speeds through a split power path with dual power source inputs. The disclosed infinitely variable power transmission system includes a transmission arrangement that provides seamless transition through forward speed ratios, a zero output speed, and reverse speed ratios, with improved efficiency. In certain embodiments, one input is provided via a constant speed power source for maximum efficiency and the other input is provided by a variable speed power source to provide an infinitely variable output speed.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A power transmission system comprising:
 a first power unit configured to deliver a first rotational torque;
 a second power unit configured to deliver a second rotational torque;
 an output element configured to be driven by the first and second power units; and a transmission arrangement configured to receive the first and second rotational torques and to deliver a resulting torque to the output element, and including a planetary gear arrangement coupling the first power unit to the output element, the planetary gear arrangement including:
a first sun gear driven by the first power unit;
a second sun gear driven by the second power unit;
first planet gears meshing with the first sun gear, the first planet gears each having a first pinion gear and a second pinion gear; and
second planet gears meshing with the second sun gear, the second planet gears each having a third pinion gear and a fourth pinion gear, the first and fourth pinion gears meshing together;
wherein the first rotational torque is routed through the planetary gear arrangement, which is configured so that a mechanical meshing engagement is continuously effected between the first power unit and the output element.

2. The power transmission system of claim 1, wherein the planetary gear arrangement further includes:
a carrier configured to carry the first and second planet gears and to deliver the first rotational torque and the second rotational torque from the planetary gear arrangement to the output element.

3. The power transmission system of claim 2, wherein the planetary gear arrangement does not include a ring gear encircling the first planet gears and the second planet gears.

4. The power transmission system of claim 2, wherein the first pinion gear and the second pinion gear are coaxial; and
wherein the third pinion gear and the fourth pinion gear are coaxial.

5. The power transmission system of claim 2, wherein the output element is configured to rotate with the carrier.

6. The power transmission system of claim 1, wherein the first power unit comprises an internal combustion engine configured to operate at a constant speed, and the second power unit is configured to provide a variable speed input to vary an output speed of the output element.

7. The power transmission system of claim 6, further comprising a harvesting unit coupled with the output element.

8. The power transmission system of claim 6, wherein the second power unit is configured as a hydraulic motor.

9. The power transmission system of claim 8, further comprising a hydraulic pump driven by the internal combustion engine, the hydraulic pump configured to supply fluid to drive the hydraulic motor.

10. A power transmission system comprising:
a first power unit configured to deliver a first rotational torque;
a second power unit configured to deliver a second rotational torque;
an output element configured to be driven by the first and second power units; and
a transmission arrangement configured to receive the first and second rotational torques and to deliver a resulting torque to the output element, and the transmission arrangement including:
a first input gear configured as a sun gear and driven by the first power unit, the transmission arrangement configured to provide a mechanical meshing engagement that is continuously effected between the first input gear and the output element;
a second input gear configured as a sun gear and driven by the second power unit at variable speeds, the transmission arrangement configured to combine the first and second rotational torques to drive the output element at the resulting torque; and
first planet gears meshing with the first input gear and second planet gears meshing with the second input gear, the first planet gears each have a first pinion gear and a second pinion gear, and the second planet gears each have a third pinion gear and a fourth pinion gear, the first and fourth pinion gears meshing together.

11. The power transmission system of claim 10, wherein the second power unit is reversible to effect variable forward speeds and variable reverse speeds of the output element.

12. The power transmission system of claim 10, wherein the second power unit is configured to provide a zero output speed to the output element by driving the second input gear in a direction relative to the first input gear that is opposite and at a speed that offsets the first power unit so that the output element is held from rotating.

13. The power transmission system of claim 10, wherein the first and second planet gears are not encircled by a ring gear.

14. The power transmission system of claim 10, wherein the transmission arrangement is configured to route the first and second rotational torques from the first and second power units to the output element without the use of a clutch.

15. A power transmission system comprising:
first and second power units;
a transmission arrangement coupling the first and second power units with an output element and including:
a first input gear configured as a sun gear and driven by the first power unit, the transmission arrangement configured to provide a mechanical meshing engagement that is continuously effected between the first input gear and the output element;
a second input gear configured as a sun gear and driven by the second power unit at variable speeds and directions; and
first planet gears meshing with the first input gear and second planet gears meshing with the second input gear, the first planet gears each have a first pinion gear and a second pinion gear, and the second planet gears each have a third pinion gear and a fourth pinion gear, the first and fourth pinion gears meshing together;
wherein the transmission arrangement is configured to effect variable forward speeds of the output element, a zero output speed of the output element, and variable reverse speeds of the output element.

16. The power transmission system of claim 15, wherein the transmission arrangement is configured to provide the zero output speed when the output element is stopped, while the first power unit drives the first input gear at a speed that is constant.

* * * * *